July 22, 1969  O. BALCAR ETAL  3,456,291
METHOD AND ARRANGEMENT FOR SHAPING OBJECTS FROM
CERAMIC RAW MATERIAL
Filed Oct. 13, 1966  3 Sheets-Sheet 1

INVENTORS
Oldřich Balcar, Karel
Vavřina

INVENTORS
Oldřich Balcar, Karel Vavřina
By Richard ... Ag't

United States Patent Office 3,456,291
Patented July 22, 1969

3,456,291
METHOD AND ARRANGEMENT FOR SHAPING OBJECTS FROM CERAMIC RAW MATERIAL
Oldřich Balcar, Hradec Kralove, and Karel Vavřina, Prague, Czechoslovakia, assignors to Ceskoslovenska akademie ved, Prague, Czechoslovakia
Filed Oct. 13, 1966, Ser. No. 586,530
Claims priority, application Czechoslovakia, Oct. 15, 1965, 6,243/65; May 12, 1966, 3,183/66
Int. Cl. B29c 1/00; B21d 26/02; B21j 5/04
U.S. Cl. 18—5                                                      3 Claims

ABSTRACT OF THE DISCLOSURE

A hollow blank consisting of ceramic powder and a binder is shaped in a mold by means of an electric arc initiated between two tubular electrodes in the cavity of the blank when a jet of conductive liquid discharged from one electrode strikes the other electrode. The arc generates a pressure wave which pushes the blank into conforming engagement with the mold wall.

---

This invention relates to an arrangement for shaping objects for industrial and domestic use from ceramic raw-material such as oxides, carbonates and silicates of metals, of alkaline earth metals and the like.

Ceramic material is usually formed in a mold by static or dynamic pressure, the ceramic material being in powder, plastic or liquid form and containing water or another organic or inorganic material as a binding agent. The pressure is generally transmitted to the ceramic mixture by means of suitable tools or by centrifugal forces. The ceramic mixture takes the shape of the mold and retains it after the forces cease and the mold is removed.

The size of the products is limited by the available equipment such as hydraulic presses, molding machines and the like. The energy supplied to these machines is consumed mainly for the operation of these machines and only a fraction thereof can be used for the shaping proper.

It is an object of this invention to provide apparatus for shaping ceramic objects which operates efficiently even when making complex shapes. It is another object of this invention to reduce the power required for forming such objects.

A still further object is to control the direction and magnitude of pressure acting upon the ceramic raw material.

With these and other objects in mind, we propose to form ceramic objects by means of pressure waves generated by electric arc discharge.

Explosives and electric arc discharges were applied heretofore to the shaping of metal objects in molds.

Ceramic objects require substantially different conditions for forming than metal objects. Generally, ceramic objects have thicker walls, the amount of material to be formed is generally greater, and the shaping forces have to be applied in a different manner. Whereas the forming of metal objects is generally accomplished in closed molds, the forming of ceramic objects by electric arc discharges is preferably performed in open molds in a liquid or gaseous medium. The ignition of the electric arc and its direction can be influenced either by an auxiliary conductor connecting the discharge electrodes or by a jet of electrically conductive liquid.

The arrangement for shaping ceramic material according to this invention will be described in detail with reference to the accompanying drawings in which FIG. 1 shows a mold arrangement of the invention in elevational section, FIG. 2 a schematic of the power supply for the electric arc, FIG. 3 shows a modification of the apparatus of FIG. 1 in a corresponding view, FIG. 4 shows another mold arrangement in the same manner, and FIGS. 5 to 8 illustrate supply voltage pulses for the devices of FIGS. 1 to 4.

Referring to FIG. 1, there is seen an upright tubular mold 2 made of two parts and closed at the bottom by a base plate 22 of electrically insulating material. A blank of ceramic mixture in the shape of a hollow cylinder 1 (see left part of FIG. 1) is introduced into the mold 2 and electrodes 4 and 5 are coaxially arranged at the top and bottom respectively of the cavity 3 in the cylinder 1. This cavity 3 can be partly filled with water. Advantageously a thin auxiliary conductor 7 (see FIG. 3) initially connects the electrodes 4 and 5. When voltage is applied to the electrodes 4 and 5 this conductor 7 evaporates and initiates an electric arc between electrodes 4 and 5. The pressure wave created by hot vapors and gases acts upon the internal wall of the cylinder 1, and causes it to conform the internal surface of the mold as indicated in the right part of FIGS. 1 and 3. FIG. 2 shows a circuit for generating the arc discharge. A transformer 8 is connected to an electric current source and supplies high voltage which is rectified by a rectifier 9 and fed through a resistor 10 to a battery of capacitors 11. A series circuit consisting of the electrodes 4 and 5, bridged by an auxiliary conductor 7, a switch 12, resistors 13, 14 and inductors 15, 16 is connected to the capacitors 11. When the switch 12 is closed, current passes from the electrodes 4, 5 through the auixilary conductor 7 which instantaneously evaporates and initiates an electric arc discharge between the electrodes 4, 5.

If the cavity 3 between the electrodes 4, 5 is occupied by a gaseous medium, the electric arc can be started by a jet of liquid. An example of a suitable arrangement in a closed mold is shown in FIG. 4. The cylinder 1 of plasticified ceramic material is introduced into the mold. The upper electrode 17 fixed in a cover 26 is hollow and forms a nozzle connected by a valve 19 to a pressure tank 18 containing an electrically conductive liquid such as a solution of sodium chloride in water. The lower electrode 20 is also hollow with a somewhat larger internal cross section than the nozzle 17 and leads into a funnel-shaped recess 21 of the base plate 22. A tank 23 is arranged below the electrode 20 to receive the used liquid which is pumped back to the pressure tank 18 by means of a pump 24.

The electric arc is started when a jet 25 of liquid from the nozzle 17 strikes the electrode 20. The evaporated liquid contributes to the generation of a pressure wave within the cavity 3.

If a ceramic powder without water is to be shaped, an auxiliary envelope of elastic material, for instance, rubber, has to be used as known to those skilled in the art in order to hold the powder material in its proper place prior to applying pressure.

In the described applications of this invention, a single electric discharge has been considered. In bodies having walls of substantial thickness or of complicated shape, cracks could be formed by a too powerful discharge. It is therefore advisable to use in some cases either a plurality of consecutive unipolar discharges of equal or different magnitude at equal or different time intervals, or a group of discharge waves of equal or different magnitude within equal or different time intervals.

Figure 1:
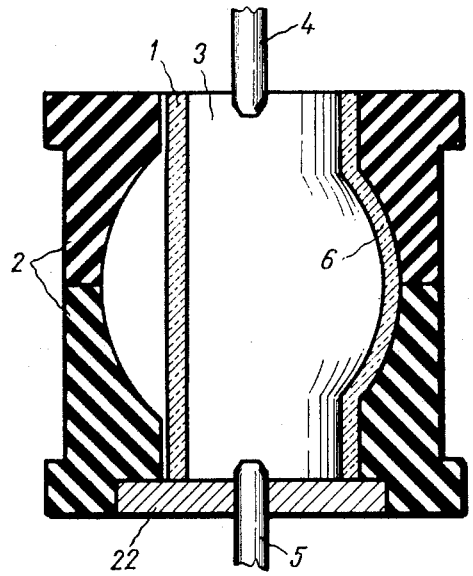
Figure 2:
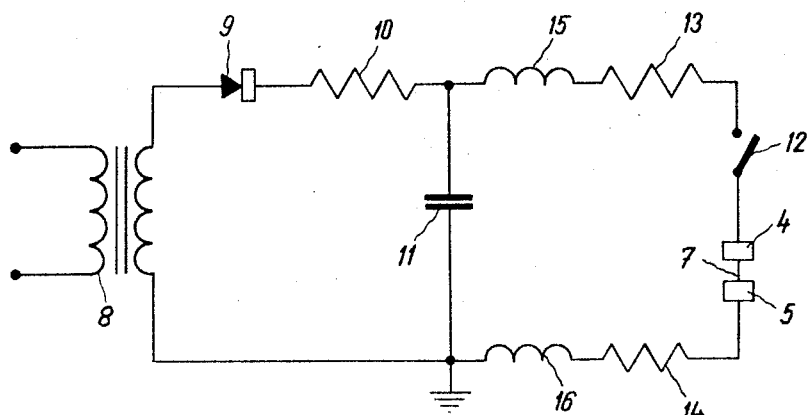
Figure 3:
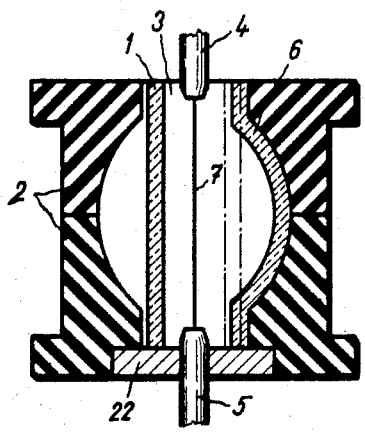
Figure 5:
FIG. 5 shows a single discharge which is a rectified half-wave pulse.
Figure 6:
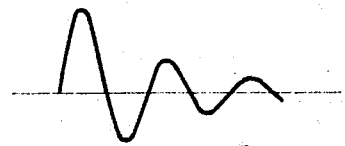
FIG. 6 shows a group of alternating voltage discharge pulses of decreasing amplitudes, FIG. 7 a series of consecutive unipolar discharge pulses, FIG. 8 groups of alternating voltage discharge pulses of decreasing amplitude. Other combinations are possible.
Figure 7:
Figure 8:
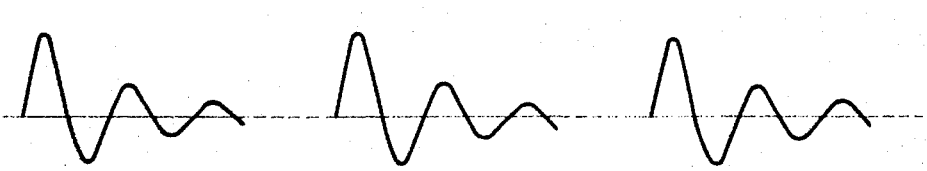
Figure 4:
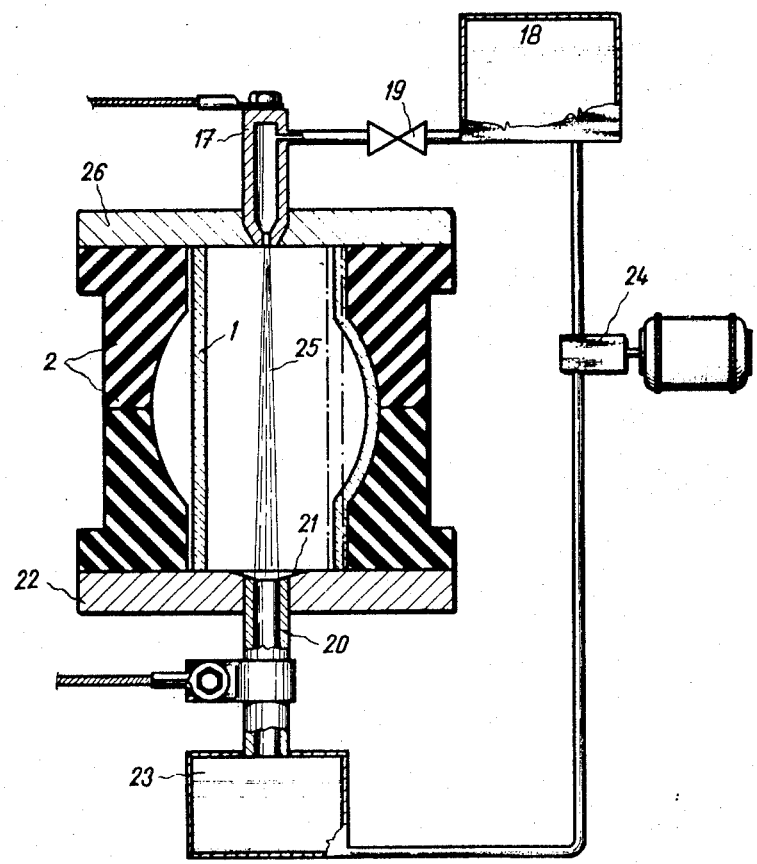

Generally the coarse forming is performed by the first pressure wave, which displaces the major part of the ceramic material close to the internal surface of the mold. The following pressure waves cause shaping of details, which generally require less power. Thus a much more efficient and more exact forming can be achieved than with a single pressure wave.

We claim:
1. An arrangement for shaping a hollow blank, comprising in combination:
   (a) a mold;
   (b) two spaced electrodes facing inward of said mold,
      (1) one of said electrodes being hollow and constituting a nozzle directed toward the other electrode;
   (c) power supply means connected to said electrodes for supplying the power of an electric arc discharge in said mold between said electrodes; and
   (d) liquid supply means for supplying a jet of an electrically conductive liquid to said one electrode for discharge from the same toward said other electrode, and for thereby initiating said discharge.
2. An arrangement as set forth in claim 1, further comprising removing means for removing said liquid from said other electrode.
3. An arrangement as set forth in claim 2, wherein said removing means include a conduit, said other electrode being hollow and constituting a portion of said conduit.

References Cited

UNITED STATES PATENTS

| | | | |
|---|---|---|---|
| 2,559,227 | 7/1951 | Rieber | 72—56 |
| 3,167,043 | 1/1965 | Furth. | |
| 3,208,254 | 9/1965 | Inoul. | |
| 3,222,902 | 12/1965 | Brejcha et al. | |
| 3,225,578 | 12/1965 | Krieger. | |
| 3,267,710 | 8/1966 | Inoul. | |

FOREIGN PATENTS 12,841   8/1961   Japan.

WILLIAM J. STEPHENSON, Primary Examiner

U.S. Cl. X.R.
72—56; 264—84